United States Patent [19]

Obbink

[11] 4,268,213

[45] May 19, 1981

[54] VEHICLE HOIST AND TOWING DEVICE

[75] Inventor: Scott M. Obbink, Armstrong, Iowa

[73] Assignee: Obbink Industries, Inc., Armstrong, Iowa

[21] Appl. No.: 28,980

[22] Filed: Apr. 11, 1979

[51] Int. Cl.³ .............................................. B60P 3/00
[52] U.S. Cl. .................................................. 414/563
[58] Field of Search .............................. 414/540-543, 414/549, 563; 296/183; 212/8 R, 35 R, 62; 254/139.4

[56] References Cited

U.S. PATENT DOCUMENTS

| | | | |
|---|---|---|---|
| 2,951,601 | 9/1960 | Castoe | 414/563 |
| 3,716,152 | 2/1973 | Sloter | 414/563 |
| 3,794,192 | 2/1974 | Monson | 212/8 R |
| 3,908,842 | 9/1975 | Place | 414/563 |

Primary Examiner—Robert W. Saifer
Assistant Examiner—L. E. Williams
Attorney, Agent, or Firm—Williamson, Bains, Moore & Hansen

[57] ABSTRACT

A vehicle hoist and towing device is positioned on the floor of a pick-up truck bed and includes a mounting frame having a hoist frame pivoted thereto for pivoting movement between lowered and elevated position. A hoist boom is mounted on the hoist frame for sliding movement between a retracted and extended position along a track secured to the hoist frame. A linkage interconnects the track and the hoist boom to a power ram for raising and lowering the hoist frame and for shifting its retracted and extended positions. A vehicle suspension mechanism is secured to the outer end of the boom for suspending the vehicle from the boom.

8 Claims, 8 Drawing Figures

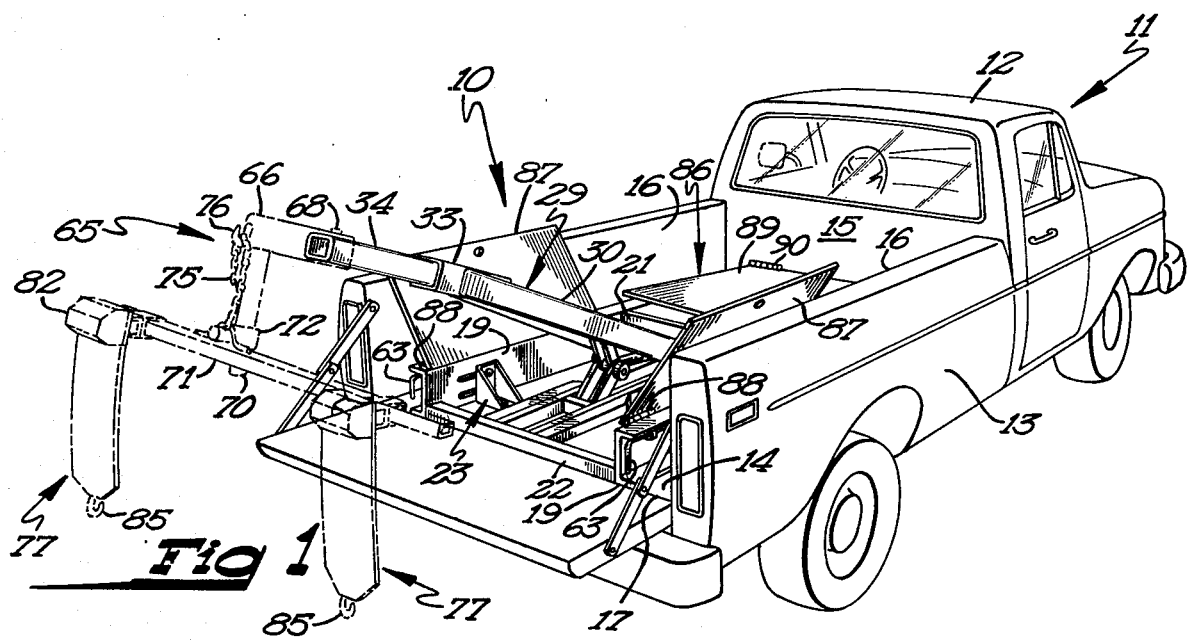
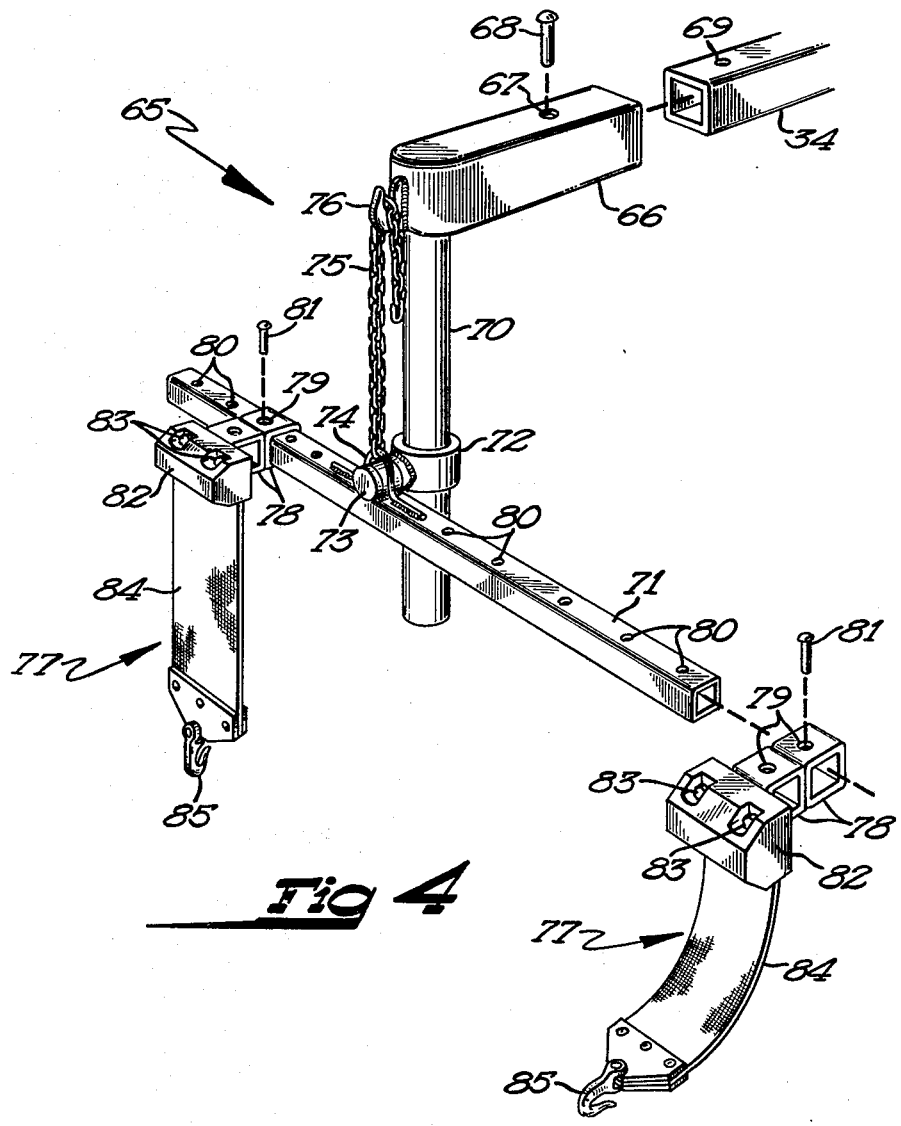

U.S. Patent  May 19, 1981  Sheet 3 of 3  4,268,213
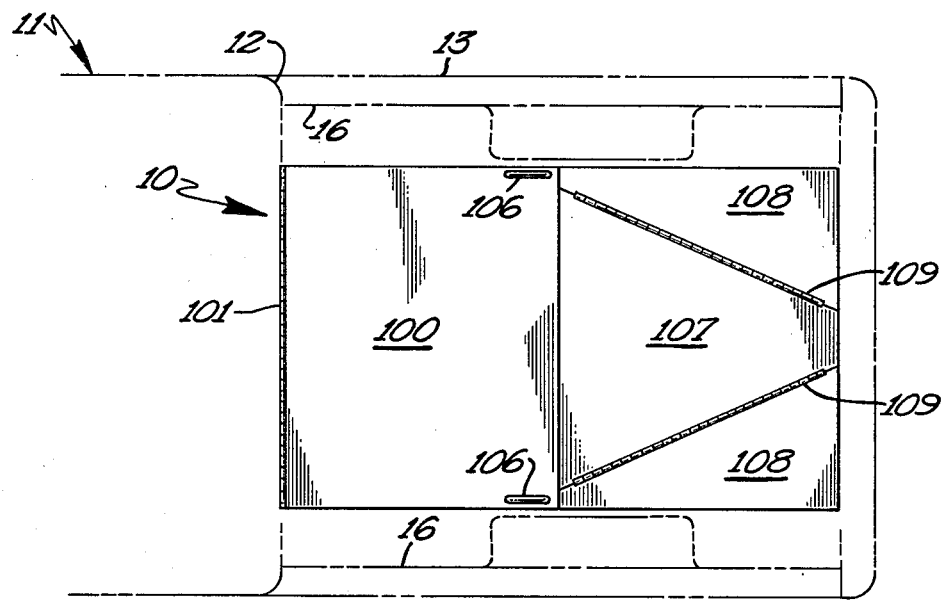
Fig 6
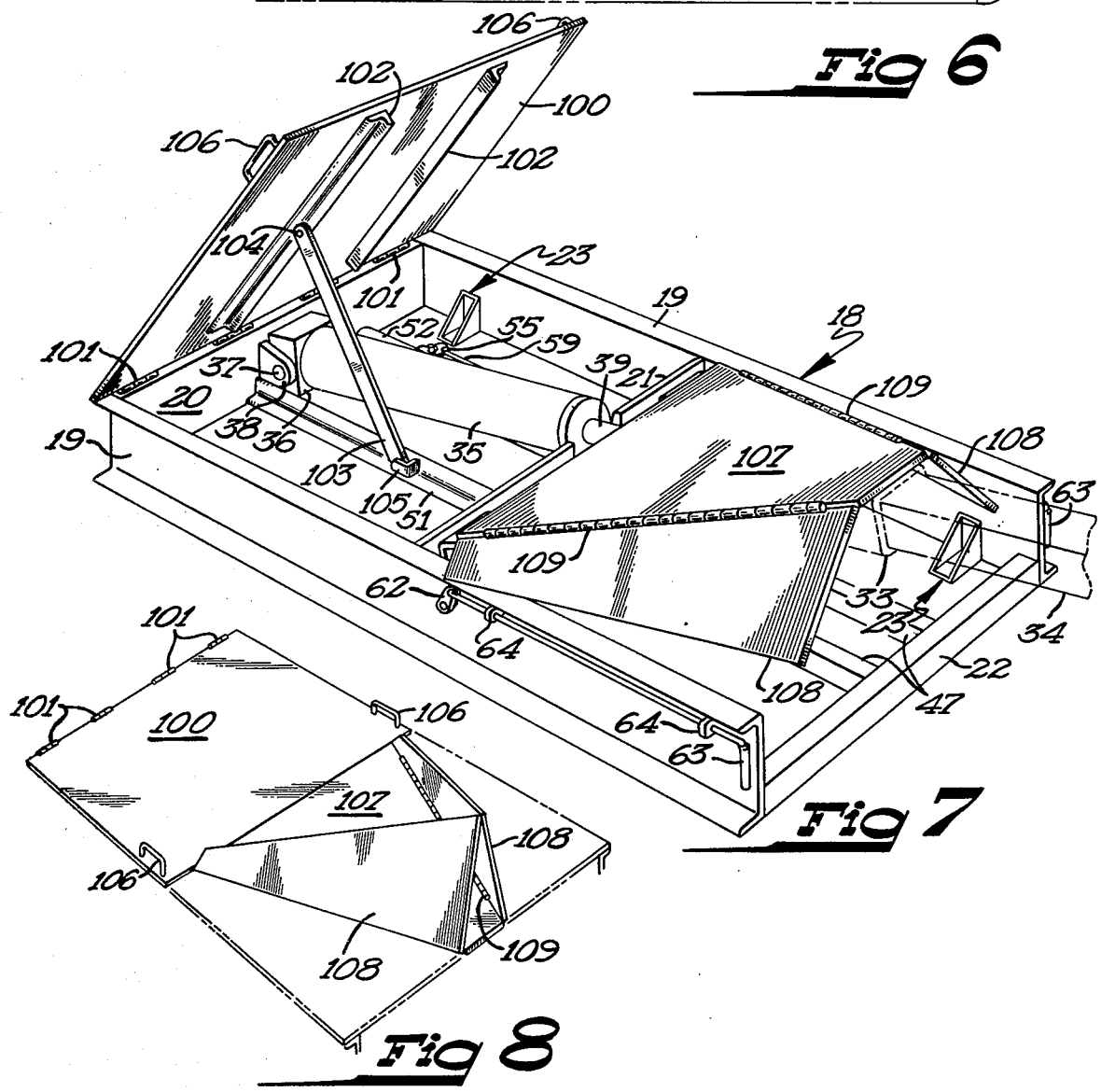
Fig 7
Fig 8

VEHICLE HOIST AND TOWING DEVICE

SUMMARY OF THE INVENTION

This invention relates to a vehicle hoist and towing device.

Conventional tow trucks are used extensively for hoisting and towing inoperative vehicles to a location for repair. However, because of the special design of conventional tow trucks, these tow trucks are limited in their utility to that of towing vehicles.

There are also certain prior art hoist and towing devices which are used with stock pick-up trucks but these hoist devices are thought to be inadequate in a number of ways. Typical of these prior art hoist devices is the type disclosed in U.S. Pat. No. 3,717,152, but this device requires manual extension and retraction of the hoist boom.

It is therefore a general object of this invention to provide a novel hoist device for installation in a stock pick-up truck, wherein the hoist boom may be readily shifted between a retracted lowered and extended raised position by power means.

Another object of this invention is to provide a vehicle hoist and towing device, of simple and inexpensive construction, which may be readily installed in a pick-up truck without altering the construction thereof to permit normal use of the pick-up truck.

These and other objects and advantages of this invention will more fully appear from the following description made in connection with the accompanying drawings, wherein like reference characters refer to the same or similar parts throughout the several views.

FIGURES OF THE DRAWINGS

FIG. 1 is a rear perspective view of a pick-up truck having my novel hoist device mounted therein, the latter being illustrated in an extended partially raised condition.

FIG. 4 is a rear partially exploded perspective view of the suspension mechanism for the hoist and towing device.

FIG. 6 is a top plan view of a different embodiment of the closure panels of the hoist and towing device when the latter is in the retracted position;

FIG. 7 is a perspective view of the embodiment of the closure panels of FIG. 6 but illustrated when the hoist and towing device is in the raised condition.

FIG. 8 is a fragmentary perspective view of the closure panels of the embodiment of FIG. 6 illustrating the rear pair of panels in open or raised position.

DESCRIPTION OF THE PREFERRED EMBODIMENT OF THE INVENTION

Figure 2:
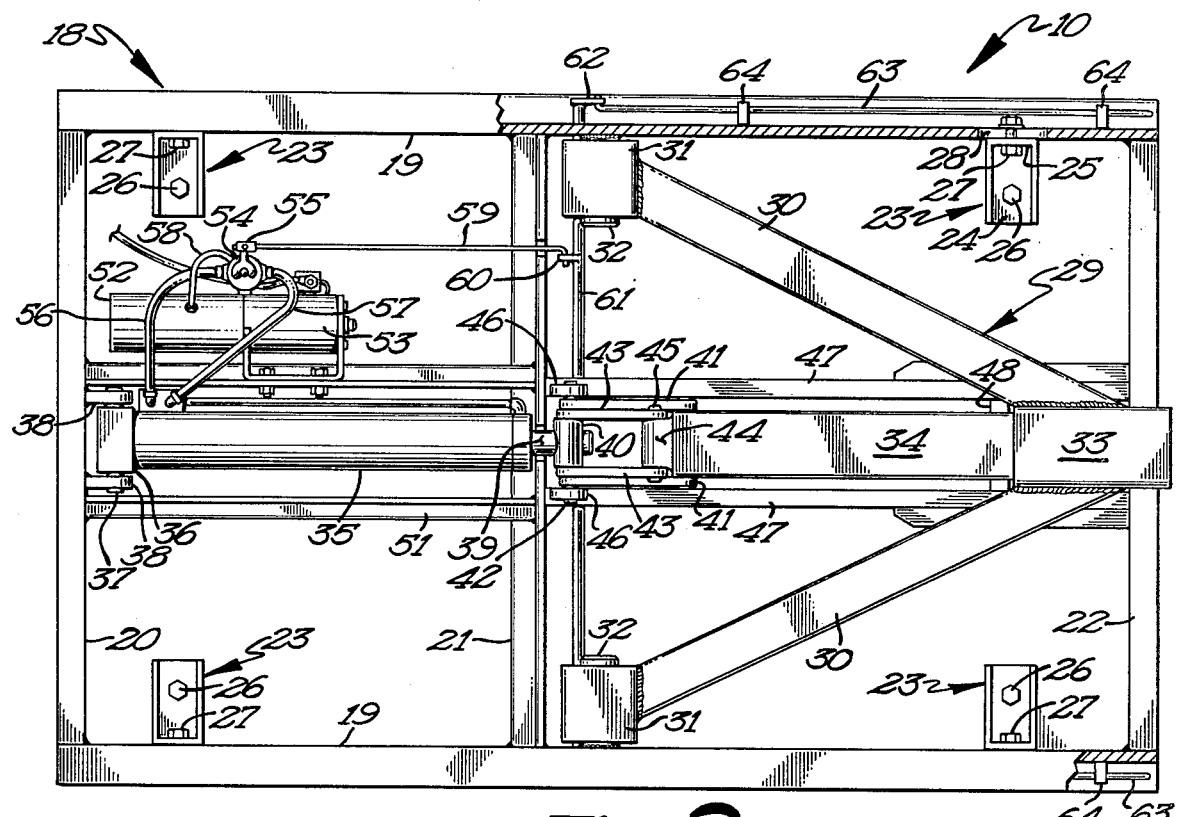
FIG. 2 is a top plan view of the hoist and towing device illustrated in the retracted position.
Figure 3:
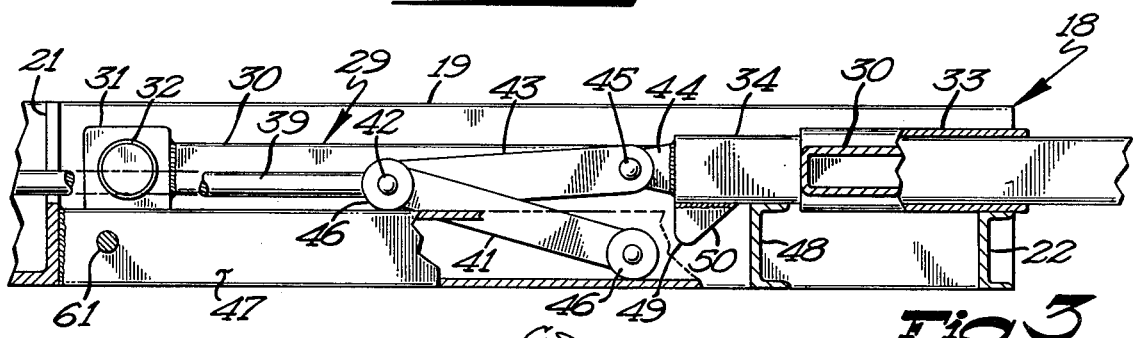
FIG. 3 is a fragmentary side view of a portion of the hoist and towing device with certain parts thereof broken away for clarity.
Figure 5:
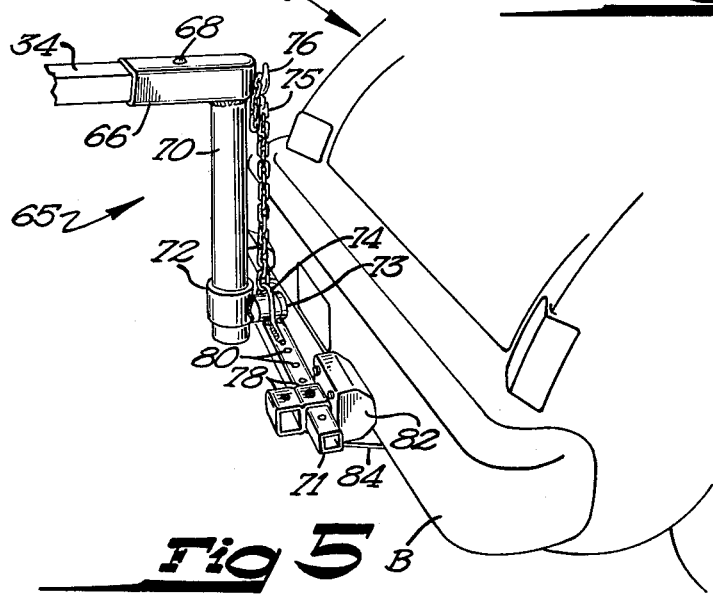
FIG. 5 is a perspective view of a portion of the hoist device.

Referring now to the drawings and more particularly, to FIG. 1, it will be seen that one embodiment of my novel hoist and towing device, designated generally by the reference numeral 10, is illustrated in mounted relation on a conventional stock pick-up truck 11. The pick-up truck 11 includes a cab 12 having a truck box or body 13, provided with a bed or floor 14. The open top box 13 also includes a front wall 15 and side walls 16. The bed 14 of the box 13 terminates in a rear edge 17.

The hoist and towing device 10 includes a generally rectangular shaped mounting frame 18 which is mounted on the floor 14 of the box 13. The mounting frame 18 includes a pair of elongate, rigid, longitudinal frame members 19 which are of channel shaped cross-sectional configuration and which are rigidly interconnected together by a front transverse frame member 20, an intermediate transverse frame member 21 and a rear transverse frame member 22.

Brackets 23 rigidly but detachably mount the mounting frame 18 on the bed 14. In this respect, the brackets 23 are each of substantially identical construction and each includes a base plate 24 and vertical plate 25, the base plate 24 being secured by bolts 26 to the bed 14 through the standard openings provided in conventional pick-up trucks. The vertical plate 25 of each bracket is secured by a bolt and nut assembly 27 to the adjacent longitudinal frame member 19. In order to accommodate different model trucks, each longitudinal frame member 19 is provided with an elongate slot 28 therein adjacent the rear end portion thereof to properly locate the base plate 24 of the rearmost pair of brackets with respect to the openings in the truck bed.

The hoist and towing device 10 also includes a hoist frame 29 which is pivotally mounted on the mounting frame 18. The hoist frame 29 includes a pair of elongate, oblique frame members 30, each being of rectangular cross-sectional configuration, and each being rigidly affixed at its front end to one of a pair of mounting blocks 31. The mounting blocks 31 are pivotally mounted on pivot sleeves 32, each pivot sleeve being rigidly secured to the adjacent longitudinal frame member 19. It will be noted that the pivot sleeves 32 are disposed in coaxial relation with respect to each other. With this arrangement, the hoist frame 29 is swingable vertically about a horizontal axis. The oblique frame members 30 are rigidly at their rear end to an elongate, generally rectangular shaped guide sleeve 33.

An elongate substantially straight hoist boom 34 of generally rectangular cross-sectional configuration is longitudinally slidable in the guide sleeve 33 between extended and retracted positions. In this regard, it will be noted that hoist boom 34 is disposed in the retracted position in FIG. 2, and is illustrated in a partially extended position in FIG. 1.

Means are provided for extending and retracting the boom 34 and for pivoting the hoist frame about its pivotal axis between raised and lowered position. This means includes a hydraulic cylinder 35 having a mounting block 36 at one end thereof which is pivotally connected by a pivot 37 to a pair of ears 38. The ears 38 are rigidly affixed to the front, transverse frame member 20 and projects rearwardly therefrom. The hydraulic cylinder 35 has a piston moveable therein to which is secured one end of an elongate piston rod 39, the latter being extensible and retractable relative to the hydraulic cylinder.

The outer end of piston rod 39 is provided with a transverse sleeve 40 to which is connected one end of a pair of links 41 by pivot 42. A second pair of links 43 are also pivotally connected to the pivot 42. It will be noted that the pairs of links 41 and the pairs of links 43 are each disposed in substantially spaced apart parallel relation and the forward ends of links 43 are connected to a mounting block 44 by pivot 45. It will also be noted that the mounting block 44 is rigidly affixed to the rear end portion of the hoist boom 34.

The rear end of each link 41 is provided with a roller 46 which rollingly engages in one of a pair of channel tracks 47. In this respect, it will be noted that the channel tracks 47 are disposed in spaced apart parallel relation and each is rigidly secured at its rear end to the intermediate frame member 41. The forward ends of the tracks 47 are rigidly interconnected to a transverse element 48 whose vertical dimension corresponds to the vertical dimension of the tracks. It will be noted that the rigid transverse element 48 is of rectangular cross-sectional configuration and serves as a cam element for the hoist boom 34. In this respect, a cam follower 49 of generally triangular shaped configuration is rigidly affixed to the lower rear surface of the hoist boom 34 and has a forwardly inclined cam surface 50 which is adapted to engage the cam element 48 to urge the rear end portion of the hoist boom upwardly.

Referring again to FIG. 2, it will be seen that a pair of elongate reinforcing angles 51 extend between and are rigidly interconnected to the rear transverse frame member 20 and the intermediate transverse member 21. These reinforcing angles 51 are disposed on opposite sides and in substantially parallel relation with respect to the hydraulic cylinder 35. The hydraulic cylinder 35 is connected in communicating relation to a reservoir 52 which contains a predetermined amount of hydraulic fluid. An electric motor pump unit 53 is connected in communicating relation to a two-way valve 54, the latter having an actuator element 55 which is shiftable from a neutral inoperative position to a first position to actuate cylinder 35 and extend the piston rod 39. The actuator element 55 of valve 54 is also shiftable to a second position to actuate cylinder 35 to cause retraction of the piston rod 39. The two-way valve 54 is connected by hydraulic lines 56 and 57 to the hydraulic cylinder and by a supply line 58 to the reservoir 52.

Means are provided for shifting the actuator element 55 of the two-way valve 54, and this means includes an elongate link 59 which has one end connected to the actuator element 55 and has its other end connected to a crank arm 60 secured to an elongate rock shaft 61. It will be noted that the rock shaft 61 extends between and is journaled in the longitudinal frame members 19 adjacent the intermediate frame member 21. It will further be noted that opposite ends of the rock shaft 61 project through the longitudinal frame members 19 and each has a crank arm 62 secured thereto. A pair of elongate actuator links 63 are each connected to one of the crank arms 62 and project forwardly therefrom. Each link 63 has its other end portion supported in a bracket for longitudinal shifting movement of the link 63. It will therefore be seen that an operator can selectively shift either of the actuator links 63 in a longitudinal direction to operate the two-way valve 54.

A suspension device 65 is removably mounted on the outer end of the hoist boom 34 and the suspension device, as best seen in FIG. 4 includes an elongate support block 66 of generally rectangular configuration which projects telescopically into the end of the boom 34. The support block 66 has an opening 67 in the upper surface thereof which is disposed in registering relation with an opening 69 in the hoist boom to permit a locking pin 68 to be inserted into the registering openings. The suspension device 65 may be readily removed from the hoist boom by simply removing the locking pin 68 and thereafter removing the mounting block from telescopic relation with respect to the hoist boom 34.

An elongate generally cylindrical vertical arm 70 is rigidly affixed to the outer end of the support block 66 and depends therefrom. In the embodiment shown, the vertical arm 70 is disposed in substantially right angular relation with respect to the mounting block 66. The vertical arm 70 cooperates with the support block 66 to support an elongate transverse arm 71 which is disposed in substantially horizontal relation when the suspension device 66 is suspending a vehicle from the hoist boom. It will be noted that the transverse arm 71 is of rectangular cross-sectional configuration.

The means for supporting the transverse arm 71 from the vertical arm includes a collar 72 which slidably engages the vertical arm for sliding movement relative thereto. The collar 72 has a cylindrical pin rigidly affixed thereto and projecting therefrom. A strap 74 has opposite end portions thereof welded to the central portion of the transverse arm 71 and has its mid-portion arcuately bent for accommodating the pin 73 therethrough. Although the strap 74 permits relative pivoting of the transverse arm about the pin 73, the strap is retained against disengagement from the pin 73. An elongate chain 75 has one end thereof secured to the strap 74 and has its other end looped about a hook 76 rigidly affixed to the outer end of the support block 66. Thus, the chain 75 may be adjusted with respect to its clamped relation with the hook 76 to adjust the heighth of the transverse arm relative to the vertical arm 70.

The suspension device 65 also includes a pair of suspension slings 77 each including a pair of substantially rectangular sleeve brackets 78 which are rigidly affixed together each being of a size to slidably engage the transverse arm 71. Each sleeve bracket 78 has an opening 79 therein which is adapted to be disposed in registering relation with one of a plurality of longitudinally spaced apart openings 80 in the transverse arm 71. A locking pin 81 is adapted to releasably lock one of the sleeves of each suspension sling in adjusted position along with the arm 71.

Each suspension sling 77 also includes a bumper engaging block 82 which is formed of a hard rubber material and which is adapted to engage the bumper of a vehicle when the latter is being towed and suspended by the hoist device. The bumper engaging block 82 is secured to the adjacent sleeve by bolts 83.

Each suspension sling 77 also includes an elongate flexible sling 84 each having one end thereof secured to the associated bumper engaging block and each having a hook 85 secured to the other end thereof. The hook 85 is adapted to be hooked to a portion of the vehicle to be towed in a well known manner.

In use, the towing device will be in the retracted lowered position and the entire apparatus will be provided with a front door 89 positioned upon the mounting frame for vertical swinging movement relative thereto by suitable hinges 90 about a transverse axis. The front door or panel 89 covers substantially the front half of the mounting and extends approximately midway of the mounting frame 18. A pair of rear doors 87 are also provided and are hingedly connected to the mounting frame by suitable hinges 88 that permit swinging movement of the doors 87 about longitudinal axes. It will further be noted that the doors 87 each have one longitudinal edge thereof positioned thereof adjacent the longitudinal midportion of the mounting frame 18. The front and rear doors actually define a false floor that readily swings to the open position when the towing device is shifted to the extended raised position. When the doors are in the lowered position, the pick-up truck can be used in its normal conventional manner.

When a vehicle is to be towed, the operator will shift one of the actuator links 63 which actuates the hydraulic system to extend the piston rod 39 from its fully retracted position. The track engaging rollers 46 will move along the track and the hoist boom 34 will be shifted in an extension direction. The operator will interrupt operation of the hydraulic cylinder 35 prior to full extension, and the suspension mechanism will then be mounted on the outer end of the hoist boom 34. The transverse arm will be vertically adjusted on the vertical arm 70 and the hooks 85 of the suspension slings 77 will engage a suitable portion of the car C to be towed. The bumper engaging blocks 82 will engage the bumper B of the automobile and the operator will then extend the piston rod 39 the full extension stroke.

It will be seen that as the hoist boom 34 is further shifted in an extension direction, the cam follower 49 will engage the cam 48 thus urging the hoist frame upwardly about its pivotal axis. Further extension of the piston rod 39 will cause the hoist frame 29 to be pivoted to its fully elevated position thereby raising the car C to be towed.

Referring now to FIGS. 6, 7 and 8, it will be seen that another embodiment of the closure panel structure for the towing device is thereshown. In the embodiment of FIGS. 6, 7 and 8, the towing device will otherwise be identical to that shown in the embodiment of FIGS. 1 through 5, and differs only in the closure panel structure that defines the false floor when the towing device is in the retracted position. The closure panel structure includes a front door panel which is of generally rectangular configuration and which is hingedly connected to the mounting frame 18 by suitable hinges 101 at its front edge to permit vertical swinging of the front panel about a longitudinal transverse axis. The lower surface of the front door panel 100 is provided with reinforcing angles 102 which are disposed in spaced apart parallel relation, one of which has an elongate substantially straight support arm 103 pivotally connected thereto by a pivot 104. When the front door panel is in the open position, the support arm engages a bracket 105 on one of the reinforcing angles 51 to support the door in an open or elevated position. The door is also provided with suitable handles 106 on its upper surface to facilitate opening and closing thereof.

The false floor or closure panel structure also includes a generally trapezoidal rear closure plate 107 which is affixed to the upper surface of the guide sleeve 33 for movement therewith. A pair of similar generally triangular shaped rear closure panels 108 are each hingedly connected to one of the longitudinal edges of the closure plate 107 by hinges 109. The hinges 109 permit swinging movement of the rear closure panels 108 in either direction from the closed position. In this regard, it will be seen that the rear closure panels 108 can pivot downwardly by action of gravity when the towing device is shifted from the retracted position to an extended elevated position. On the other hand, the rear closure panels 108 may be pivoted upwardly, as illustrated in FIG. 8, to provide access to the space below. With this arrangement, the towing device may be retracted below the false floor and may be readily shifted to the extended position with little effort.

It will also be seen that the automobile will be readily lowered by simply reversing the aforementioned procedure. It will further be seen that the novel towing device is controlled completely by the operator standing adjacent the rear of the pick-up truck. A single power ram is used to extend and retract the hoist boom and to raise and lower the hoist frame.

Thus, it will be seen that I have provided a novel hoist and towing device, which is not only of simple and inexpensive construction, but one which functions in a more efficient manner than any heretofore known or comparable device.

What is claimed is:

1. A vehicle hoist and towing device for a truck having a bed comprising:
    a mounting frame mounted on the truck bed,
    an elongate, track means fixedly secured to said mounting frame and extending longitudinally thereof, and located generally centrally of the truck bed;
    a hoist frame pivotally secured to said mounting frame for vertical swinging movement relative to the mounting frame between lowered and elevated positions,
    an elongate hoist boom slidably mounted on said hoist frame for longitudinal movement relative thereto between a retracted position and extended position, said boom being positioned generally centrally of the truck bed, said boom when in said retracted position being disposed within the confines of said mounting frame, and when in said extended position projecting longitudinally from the rear of the mounting frame and associated truck,
    linkage means interconnected with said boom and engaging said track means,
    a reversible hydraulic cylinder and piston unit connected with said mounting frame and to said linkage means, said hydraulic cylinder and piston unit when shifting said boom from said fully retracted position in an extension direction, to move said boom rectilinearly throughout the major portion of its extension stroke and thereafter causing said hoist frame to swing from a lowered to an elevated position to elevate the boom.

2. The device as defined in claim 1 and a suspension mechanism detachably connected with the outer end of said hoist boom and adapted to engage a vehicle to be towed.

3. The device as defined in claim 1 wherein said linkage means includes first and second links pivotally connected together, one of said links being pivotally connected with one end of said hoist boom and the other link having track engaging means thereon engaging said track means for movement therealong.

4. The device as defined in claim 1 and a cam follower element on said hoist boom adjacent one end thereof engageable with a cam element mounted adjacent one end of said mounting frame and cooperating with the cam follower element to cam the hoist boom upwardly during the terminal portion of the extension stroke.

5. The device as defined in claim 1 wherein said hoist frame is pivotally connected to said mounting frame adjacent the mid-portion of the latter.

6. The device as defined in claim 2 wherein suspension mechanism includes an elongate vertical arm, means detachably mounting said vertical arm on the end of said hoist boom, an elongate transverse arm pivotally adjacent its midportion to said vertical arm, a pair of suspension slings each being mounted on said transverse arm for adjustment along the length thereof.

7. The device as defined in claim 1 wherein said hoist frame is provided with a guide element located adjacent one end of said frame, said hoist boom slidably engaging said guide element for sliding movement relative thereto.

8. The device as defined in claim 1 and a plurality of closure structures overlying said mounting frame to form a false floor for the truck bed when the boom is in the fully retracted position, said closure structure including a plurality of panels, certain of said panels being hingedly mounted on said hoist frame for movement therewith and for pivotal movement relative thereto, and one of said panels being hingedly mounted on said mounting frame for swinging movement relative thereto.

* * * * *